No. 607,084. Patented July 12, 1898.
Y. W. ROGERS.
DINNER PAIL.
(Application filed Nov. 10, 1897.)
(No Model.)
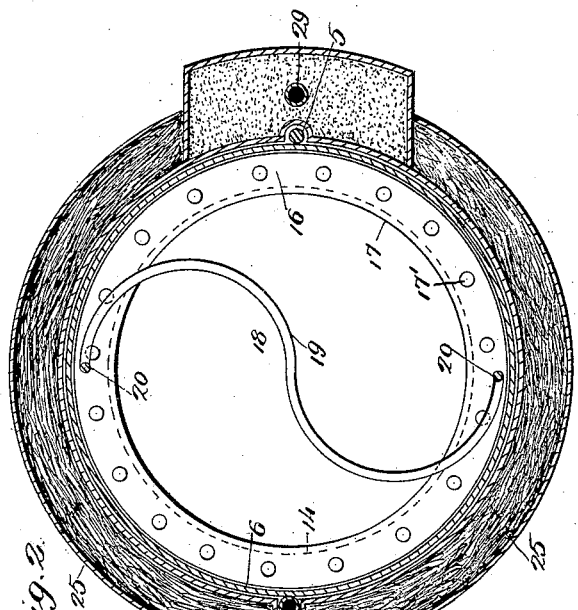
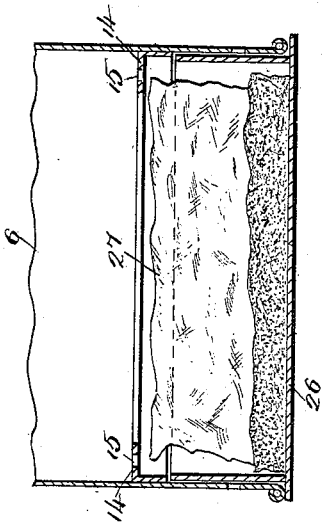
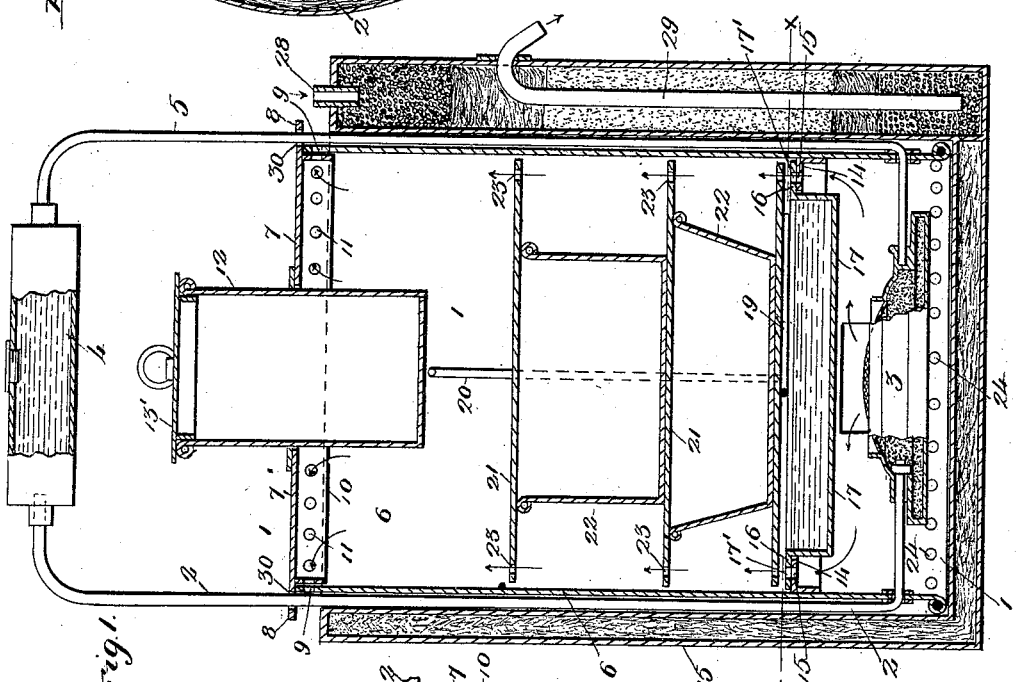
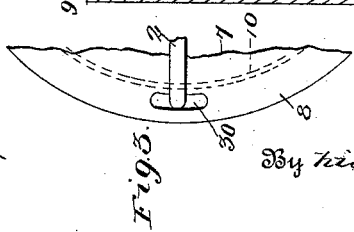
Witnesses
Alfred A. Mathey
R. Elliott
Inventor
Yubie W. Rogers.
By his Attorneys
Heller & Heller

UNITED STATES PATENT OFFICE.

YUBIE W. ROGERS, OF ST. LOUIS, MISSOURI.

DINNER-PAIL.

SPECIFICATION forming part of Letters Patent No. 607,084, dated July 12, 1898.

Application filed November 10, 1897. Serial No. 658,046. (No model.)

*To all whom it may concern:*

Be it known that I, YUBIE W. ROGERS, a citizen of the United States, residing at St. Louis, State of Missouri, have invented certain new and useful Improvements in Dinner-Pails, of which the following is a full, clear, and exact description, reference being had to the accompanying drawings, forming a part hereof.

My invention has relation to improvements in dinner-pails; and it consists in the novel arrangement and combination of parts more fully set forth in the specification and pointed out in the claims.

In the drawings, Figure 1 is a vertical longitudinal section of my complete invention. Fig. 2 is a transverse horizontal section taken on the line $x\,x$ of Fig. 1. Fig. 3 is a detail plan view, broken away, showing the top of the pail; and Fig. 4 is a longitudinal section similar to Fig. 1, with the upper portion of the pail broken away, showing the same provided with a receptacle for ice.

The object of my invention is to construct a complete and practical dinner-pail in such a manner that the same may be used for cooking and cooling any and all kinds of food, and, further, in providing the said pail with a detachable jacket adapted to be packed with suitable material in order to resist the action of heat when it is desired to use the pail as a cooler or ice-box, a portion of said jacket being properly divided to form a filter for filtering the water to be used for cooking and drinking.

In detail the invention may be described as follows:

Referring to the drawings, 1 represents a pail made of suitable material, the same being cylindrical in cross-section; but any other form or design might be employed without departing from the nature of my invention.

2 represents a small pipe or tube which when in its normal position stands vertically, as shown in Fig. 1, the lower end of which passes loosely through the pail 1 and loosely communicates with the burner 3, which may be either alcohol, coal-oil, or any other type, the fuel passing down the pipe from the reservoir 4, forming the handle of the bucket. From the opposite side of the handle or reservoir leads a wire 5 in the same direction as the pipe 2 and also passing through the pail and movably supporting the opposite side of the burner. The burner 3 is heavier at its bottom, which causes it to assume the proper position, as shown in Fig. 1.

The cylindrical chamber 6 of the pail is practically open at both ends, it being normally covered at its top by a removable cover 7, having an annular flange 8, which rests upon the upper edge of the chamber 6. Formed in the cylindrical chamber adjacent to its upper edge and in a horizontal line are a series of circular openings 9, arranged at predetermined distances apart, and also formed in the vertical annular flange 10 of the cover are a series of similar openings 11, which register with the openings 9, whereby when the cover is slightly turned in either direction the regulation of the draft within the chamber is effected. The cover 7 is provided with a central opening for receiving a cup 12, having a flange 13, which rests upon the upper surface of the cover, whereby it is held in proper position, the cup being provided with an ordinary cover 13'. The cup 12 is preferably designed for heating or boiling coffee, but can be used for any other purpose desired. Secured to the inner cylindrical surface of the chamber 6 at a suitable distance above the burner 3 is an annular ledge 14, having a series of openings 15 formed through the same in a true circular line and at predetermined distances apart, and removably resting upon said ledge is the annular flange 16 of a pan 17, adapted to contain water or the like. The flange 16 is also provided with openings 17', which register with the openings 15, whereby upon turning the pan 17 the heat is regulated within the chamber for properly cooking the food contained therein.

18 represents a detachable frame made of a single piece of wire, the same having an S-shaped base 19 and two straight upright rods 20, located diametrically opposite one another, as best shown in Fig. 2, the whole adapted to rest upon the annular flange 16 of the pan for supporting and holding in position any number of circular plates 21, between which plates pans 22 of suitable size and design are located for receiving the different kinds of food to be cooked. The said plates 21 are provided with openings 23, through which the heat is adapted to pass, whereby all the food contained in the chamber may be thoroughly cooked. Should it be desired to bring the flame in direct contact with a pan or other cooking utensil, the cover 7 is removed or raised upon the pipe 2 and the rod 5 and the chamber turned in such a position that the cover 7 may be inserted in the lower end of the same, or, in other words, the chamber is reversed or turned end for end. Arranged around the chamber 6, adjacent to its lower edge, are a series of openings 24 similar to the openings 9, the openings 11 of the flange of the cover registering with the openings 9 for the purpose previously described.

The pail constructed as before described is adapted to be placed or inserted into a jacket 25, suitably packed with any well-known material that will resist the action of heat, and when the pail is so placed within the jacket it may be used as an ice-box or cooler for preserving perishable food by first inserting into the bottom of the chamber the pan 26, as shown in Fig. 4, the latter containing a sponge or other absorbent material upon which the ice 27 is placed, the said sponge collecting and holding the waste water or drippings from the ice.

A portion of the jacket 25 is divided off into a separate chamber or receptacle to be employed as a water-filter, the same adapted to be packed with any suitable filtering material and the top provided with a nipple 28, to which may be attached a pipe or hose leading from any suitable water-supply. The water on entering the filter passes first through the filtering material contained therein, and after being thoroughly filtered is forced up the vertical pipe 29, leading to the outside of the filter. The water is cooled by the filter being in close contact with the chamber 6 when the latter is used as an ice-box. In order that the cover 7 may be sufficiently turned to regulate the draft through the chamber 6, slots 30 are formed in the flange 8 of said cover, through which the pipe 2 and rod 5 pass, as best shown in Fig. 3.

In carrying out my invention I do not limit myself to the exact construction and arrangement of the parts as herein shown and described, as the same may be materially modified without departing from the spirit of my invention. The shape of the pail may also be changed to a rectangular box, and any suitable burner or fuel might also be employed.

In using the pail for cooking the detachable jacket 25 is removed; but when said pail is used as a cooler or ice-box the lamp 3 is removed, together with its connections, and the pan 26 inserted into the bottom of the pail and the jacket placed in the position as shown in Fig. 1.

Having fully described my invention, what I claim is—

1. A dinner-pail comprising a chamber a burner located within the same, a pipe in communication with the interior of the said burner, and movably fixed thereto a reservoir for containing liquid fuel forming a handle to which the opposite end of the pipe communicates, and a rod leading from the opposite side of the reservoir and leading to and movably connected to the burner, substantially as described.

2. A dinner-pail comprising a suitable chamber, a cover for the same having an annular flange, a suitable burner located within said chamber, a pipe in movable communication with the interior of said burner, a reservoir for liquid fuel forming a handle, the said pipe being also in communication with said reservoir, a rod leading from the opposite side of the reservoir and leading to and also in movable connection with the burner, and slots formed in the flange of the cover through which the rod and pipe pass, whereby the handle is held in its proper position and the cover permitted to be removed from the chamber, substantially as and for the purpose described.

In testimony whereof I affix my signature in presence of two witnesses.

YUBIE W. ROGERS.

Witnesses:
C. F. KELLER,
ALFRED A. MATHEY.